United States Patent [19]

Lupinski

[11] 4,346,136

[45] Aug. 24, 1982

[54] BONDABLE MAGNET WIRE COMPRISING POLYAMIDE-IMIDE COATING CONTAINING RESIDUAL SOLVENT

[75] Inventor: John H. Lupinski, Scotia, N.Y.

[73] Assignee: General Electric Company, Fort Wayne, Ind.

[21] Appl. No.: 168,481

[22] Filed: Jul. 14, 1980

[51] Int. Cl.[3] ........................ B05D 5/10; B32B 15/02; B32B 15/08; H01B 3/30

[52] U.S. Cl. ............................. 428/213; 174/110 SR; 427/118; 428/383; 428/473.5

[58] Field of Search ..................... 428/383, 213, 473.5; 174/110 SR

[56] References Cited

U.S. PATENT DOCUMENTS 3,456,338 7/1969 Mohrman et al. .

3,528,852 9/1970 Olson .

OTHER PUBLICATIONS

Bailly et al., *Revue Generale de l'Electricite*, 87, (2), pp. 149–159, Feb. 1978.

*Primary Examiner*—James C. Cannon

*Attorney, Agent, or Firm*—Ralph E. Krisher, Jr.

[57] ABSTRACT

A bondable enamel coated, insulated electrical conductor such as magnet wire. The bondable electrical conductor is formed by a base insulation coating on a metallic conductor such as wire, the base coating being a thermosetting, resin enamel, and a bondable overcoat of polyamide-imide enamel applied on said base coating. The polyamide-imide enamel includes residual solvent so that the polyamide-imide enamel is self-bondable.

9 Claims, No Drawings

BONDABLE MAGNET WIRE COMPRISING POLYAMIDE-IMIDE COATING CONTAINING RESIDUAL SOLVENT

BACKGROUND OF THE INVENTION

1. Field of the Invention

The present invention relates to magnet wire having a bondable coating thereon and more particularly to bondable magnet wire finding particular, but not necessarily exclusive utility for the coil windings of dynamo electric machines adapted for use in hermetic atmospheres.

2. Description of the Prior Art

Magnet wire including a bondable overcoat has been described in the art. See, for example U.S. Pat. No. 2,916,403, issued Dec. 8, 1959, to G. C. Calderwood, for BONDING COMPOSITIONS; U.S. Pat. No. 3,456,338, issued July 22, 1969, to D. W. Mohrman, et al., for METHOD FOR CHANGING THE CONFIGURATION OF AND FOR BONDING ELECTRICAL COILS OF INDUCTIVE DEVICES; U.S. Pat. No. 3,300,843, issued Jan. 31, 1967, to T. Umewaka, et al., for SELF BONDING MAGNET WIRE AND METHOD; U.S. Pat. No. 3,516,858, issued June 23, 1970, to A. F. Fitzhugh, et al., for SELF-BONDING MAGNET WIRE AND PROCESS FOR PREPARING THE SAME; U.S. Pat. No. 3,676,814, issued July 11, 1972, to F. F. Trunzo, et al., for HIGH TEMPERATURE ADHESIVE OVERCOAT FOR MAGNET WIRE; and U.S. Pat. No. 4,152,103, issued May 1, 1979 to R. H. Napierski, for DEVICE FOR BAKING SELF-BOND COIL WIRE.

Polyesterimide wire enamels are well-known and widely used in the art of forming magnet wire for high temperature hermetic applications. Compositions and methods for forming polyesterimide wire enamels are well-known, and the application thereof to wire to form magnet wire is conventional and well-known to those of ordinary skill in the art.

Synthetic polyester resin wire enamels are also known and widely utilized. One particularly successful polyester magent wire insulation resin is manufactured by the General Electric Company under the Trademark ALKANEX, and is disclosed in U.S. Pat. No. 2,936,296, issued May 10, 1960, to F. M. Precopio, et al., for POLYESTERS FROM TEREPHTHALIC ACID, ETHYLENE GLYCOL, AND A HIGHER POLYFUNCTIONAL ALCOHOL.

Polyamide-imide wire enamels are known and widely used in the art of producing magnet wire. See, for example, U.S. Pat. No. 3,428,486, issued Feb. 18, 1969, to N. J. George, for POLYAMIDE-IMIDE ELECTRICAL INSULATION; U.S. Pat. No. 3,475,212, issued Oct. 28, 1969, to H. J. Bach, for METAL CONDUCTOR COATED WITH NONLINEAR COPOLYESTER BASECOAT LAYER AND POLYAMIDE-IMIDE OUTER LAYER; U.S. Pat. No. 3,528,852, issued Sept. 15, 1970, to E. H. Olson, et al., for DUAL-COATED ELECTRICAL CONDUCTOR; and U.S. Pat. No. 3,695,929, issued Oct. 3, 1972, to F. A. Sattler, for CONDUCTORS INSULATED WITH A POLYMERIC AMIDE-IMIDE-ESTER AND AN AROMATIC POLYIMIDE OR AROMATIC POLYAMIDE-IMIDE OVERCOAT. Polyamide-imide wire enamels are conveniently applied from solutions of the polymer in a solvent, such as n-methyl pyrrolidone (NMP). For a discussion of the effect of residual solvent on the properties of cured polyamide-imide coatings, see P. Bailey and J. N. Communal, *Revue* Générale De L'Electricité, February 1978, Vol. 87 #2 at pages 149–159, at pg. 152.

The polyamide-imide enamel coating is conventionally applied to the wire substrate from a solution of the polyamide-imide in a suitable solvent, such as N-methylpyrrolidone (NMP), in a conventional wire tower, such as shown for example, in U.S. Pat. No. 3,183,604, issued May 18, 1965, to J. D. Stauffer, for APPARATUS AND PROCESS FOR REMOVING SOLVENTS FROM COATINGS ON METAL; U.S. Pat. No. 3,183,605, issued May 18, 1965 to D. D. Argue, et al., for APPARATUS FOR COATING METALS; and U.S. Pat. No. 3,351,329, issued Nov. 7, 1967, to D. W. Thomas, for WIRE COATING OVEN APPARATUS.

OBJECTS AND SUMMARY OF THE INVENTION

The principal object of the present invention is to provide an improved bondable magnet wire having mechanical, electrical and thermal properties suitable for hermetic and high temperature electrical applications.

Another object of the present invention is to provide a bondable magnet wire capable of use in hermetic motors operating in Freon atmospheres and which maintains the necessary dielectric strength in such atmospheres.

Still another object of the present invention is to provide a bondable magnet wire which retains measurable bond strength at temperatures to which the unit formed therefrom may be subjected.

A further object of the present invention is to provide a bondable magnet wire capable of being thermally bonded in short periods of time at a temperature not exceeding 230° C., and effective to provide a measurable bond strength between the bondable magnet wire strands at temperatures up to 250° C.

Still a further object of the present invention is to provide a bondable magnet wire having flexibility, abrasion resistance, and other characteristics suitable for the automatic winding of coils and production of electric motors and like products.

A further object of the invention is to provide a bondable magnet wire of the foregoing character which can be handled, stored and used at normal room conditions.

Other objects and advantages of the present invention will become apparent from the following description of the preferred embodiment.

In accordance with the foregoing objects, the present invention comprises a bondable magnet wire formed of a metallic conductor substrate, such as copper or aluminum wire, having a base coating thereon of a material such as a polyesterimide enamel. On top of the base coating there is provided a bondable overcoat of a polyamide-imide enamel. The ratio of thickness of base coat to overcoat is about 2 to 1.

DESCRIPTION OF THE PREFERRED EMBODIMENT

The present invention comprises a bondable, enamel coated, insulated, electrical conductor. An electrical conductor substrate such as a wire of copper or aluminum, is provided with a base insulation coating thereon. The base insulation coating is formed of cured, solid, thermosetting resin enamel such as a polyesterimide, polyester, or the like. Overcoating the base insulation is a bondable overcoat of solid, undercured polyamide-imide resin, applied from a solution of the polyamide-imide resin in N-methyl pyrrolidone, and undercured to leave residual NMP in the coating. The bondable magnet wire thus formed is comprised of a bondable polyamide-imide overcoat on a polyesterimide or polyester enameled wire, and is suitable for automatic winding into coils for the production of electric motors and the like. The magnet wire finds particular, but not necessarily exclusive utility for use in hermetic atmospheres, and particularly in applications in which the motors are subjected to materials such as the Freon refrigerants or are adapted for submersion in water. The bondable wire exhibits not only the necessary high temperature electrical properties, but also the scrape resistance and windability characteristics necessary for use in automatic coil winding equipment.

Magnet wire embodying the present invention is readily prepared in conventional wire enamel towers. Illustratively, copper and aluminum wire was provided with a two-thirds of normal film build of polyesterimide enamel at the extremes of cure within the operating range, namely light bake and dark bake. The wires were prepared free of any spooling oil. The wires were then provided with an overcoat of polyamide-imide resin enamel of a thickness one-half of the base coat, or a total of one-third of the normal overall coating. The overcoat was partially or undercured in the wire tower to leave residual NMP solvent in the coating.

Coatings of polyamide-imide enamel are applied to the base coated wire from solutions of the polymer in an appropriate solvent such as N-methyl pyrrolidone (NMP). Small residual amounts of NMP, deliberately left in the polyamide-imide film upon application, cause the polyamide film to be self-bondable and bond to itself under conditions of pressure and temperature achievable within the limits of the current manufacturing process for hermetic motors. Although the NMP solvent is removed from the polyamide-imide film during the bonding operation, it has been found to function as a plasticizer for the polyamide-imide coating to the extent that the wires become bonded to themselves and then display measurable bond strength at 250° C., a temperature adequate for the purposes of producing hermetic motors.

Polyamide-imide magnet wire enamels are commercially available, such as AI-600 enamel from the Insulating Materials Product Section of General Electric Company, or AI-981 enamel from the P. D. George Co. These illustrative enamels were coated over a polyesterimide film insulation on copper wire in such a fashion that the polyamide-imide was sowewhat undercured and contained residual NMP. Bond strength tests on these self-bondable wires are shown in Table I.

TABLE I

Polyamideimide Overcoats on Polyesterimide Wire

| Overcoat Material | Wire Speed in Tower (ft/min) | Build (mils) | Bond Strength @ 250° C. (lbs) |
|---|---|---|---|
| GENERAL ELECTRIC AI-600 | 55 | 1 | .7 |
| GENERAL ELECTRIC AI-600 | 60 | 1 | .6 |
| GENERAL ELECTRIC AI-600 | 65 | 1 | .8 |
| P. D. GEORGE AI-981 | 55 | 1 | .7 |
| " | 60 | 1 | .9 |
| " | 65 | 1 | 1.0 |

The bond strength data given in Table I were determined according to ASTM test D2519, on 3×¼" coils made from esterimide/amideimide coated 0.0427" copper wire. Bonding was achieved by raising the temperature of the wire to 230° C. in 5 seconds by resistance heating and maintaining a 230° C. temperature for an additional 10 seconds.

The weight loss of 3 foot length wire samples of the above coated wire was determined for conditions similar to those of the bonding operations, and the results are presented in Table II.

TABLE II

Weight Loss as a Function of Residual Solvent per 3 ft of Wire

| Overcoat Material | Wire Speed (ft/min) | Weight Loss (mg) 1 min. @ 230° C. | Weight Loss (mg) 1 min. @ 230° C. + 5 min. @ 250° C. |
|---|---|---|---|
| GENERAL ELECTRIC AI-600 | 55 | 3.5 | 10.7 |
| GENERAL ELECTRIC AI-600 | 60 | 4.4 | 12.0 |
| GENERAL ELECTRIC AI-600 | 65 | 4.7 | 12.7 |

Table II shows that by increasing the wire coating speed in the wire tower, larger amounts of residual solvent remain in the coating and thus the coated wire is self-bondable as demonstrated in Table I.

The bondable magnet wire produced as described above retains its desirable bondable characteristics even after storage at room temperature over a period of several months. It appears that the polymer coating retains its solvent under normal room temperature conditions, thus providing for a reasonable commercial shelf life. It has also been observed that the bondable wire does not self-bond during storage of spools of the bondable wire under ambient conditions, and special storage and handling conditions are not required.

The insulated magnet wire with a bondable coating embodying the present invention may alternatively utilize a polyester base coat under the bondable polyamide-imide overcoat. One illustrative polyester base coat is the polyester ALKANEX, disclosed in U.S. Pat. No. 2,936,296. As with the polyesterimide, a coating of approximately two-thirds the normal coating thickness of the ALKANEX polyester is applied to a wire substrate, followed by an overcoat of the remaining one-third of the polyamide-imide bondable coating. The insulated magnet wire thus formed is bondable in addition to retaining the properties of the conventional polyester coated magnet wire as disclosed in U.S. Pat. No. 2,936,296.

The magnet wire may alternatively be provided with a polyimide undercoat of a polyimide polymer such as described in application Ser. No. 150,725, filed May 19, 1980, by Marvin A. Peterson and Fred F. Holub for IMPROVED POLYAMIDE ACID POLYMER COATING COMPOSITION AND BONDABLE SUBSTRATE. A coating of the partially imidized polyamide acid coating composition is applied to the wire in a conventional wire tower. The coating is fully cured to a polyimide to provide an electrical grade undercoat on the magnet wire. To the undercoated wire there is then applied an overcoat of polyamideimide, each layer of which is undercured, to produce a bondable magnet wire of the character described herein.

While an illustrative embodiment of the present invention has been described, it should be understood that there is no intention to limit the invention to the specific form disclosed. On the contrary, the intention is to cover all modifications, alternative constructions, equivalents and uses falling within the spirit and scope of the invention as expressed in the appended claims.

I claim:

1. A bondable, non-tacky, enamel coated, insulated, electrical conductor comprising an electrical conductor, a base insulation coating on said conductor of cured, solid, thermosetting, resin enamel, and an overcoat of polyamide-imide enamel on said base coating, characterized in that said polyamide-imide enamel includes residual solvent in an amount such that said polyamide-imide enamel is self-bondable upon heating to a temperature above the ambient temperatures at which said conductor is stored and worked.

2. A bondable electrical conductor as defined in claim 1, wherein said base enamel and said bondable enamel are in a thickness ratio of about 2 to 1 respectively.

3. A bondable electrical conductor as defined in claim 1, wherein said solvent is N-methyl pyrrolidone.

4. A bondable electrical conductor as defined in claim 1, wherein said base enamel is selected from the group consisting of polyesterimide, polyamideimide, polyester, polyimide and polyesteramideimide wire enamels.

5. A bondable enamel coated, insulated, electrical conductor comprising, in combination, an electrical conductor, a base insulation coating on said conductor of cured polyesterimide enamel, and a bondable overcoat insulation coating on said base coating of polyamide-imide enamel containing residual solvent in an amount sufficient to provide bonding upon heating said overcoat to a temperature of between about 220° C. and about 230° C., but insufficient to cause tack or bonding at ambient temperatures.

6. A bondable electrical conductor as defined in claim 5 wherein said base coating and said overcoating are in a thickness ratio of about 2 to 1 respectively.

7. A bondable electrical conductor as defined in claim 5 wherein said solid, thermoplastic, resin enamel is bondable in the range of about 220° C. to 230° C.

8. A bondable electrical conductor as defined in claim 5 wherein said base coating and said overcoat retain bonded strength up to at least about 250° C.

9. A bondable electrical conductor as defined in claim 5 wherein said conductor is bondable by resistance heating of the electrical conductor at a temperature of between 220° C. and 230° C. in a period of approximately five seconds.

* * * * *